US006879058B2

(12) United States Patent
Lorenz et al.

(10) Patent No.: US 6,879,058 B2
(45) Date of Patent: Apr. 12, 2005

(54) DOOR LATCH ARRANGEMENT

(75) Inventors: Lutz Lorenz, Ingolstadt (DE); Philippe Ottolini, La Volvre (FR)

(73) Assignee: ArvinMeritor Light Vehicle Systems (UK) Ltd., Stirchley (GB)

( * ) Notice: Subject to any disclaimer, the term of this patent is extended or adjusted under 35 U.S.C. 154(b) by 238 days.

(21) Appl. No.: 10/226,368

(22) Filed: Aug. 22, 2002

(65) Prior Publication Data

US 2003/0052538 A1 Mar. 20, 2003

(30) Foreign Application Priority Data

Aug. 31, 2001 (GB) ............................................. 0121066

(51) Int. Cl.[7] ................................................... B60L 5/00
(52) U.S. Cl. ....................... 307/10.1; 292/201; 292/216
(58) Field of Search ................................ 292/216, 201; 307/10.1, 9.1

(56) References Cited

U.S. PATENT DOCUMENTS 5,029,915 A * 7/1991 Wilkes .................... 292/336.3
5,221,024 A * 6/1993 Campbell ...................... 221/3
6,094,131 A * 7/2000 Chen et al. ............ 340/426.36
6,123,371 A * 9/2000 Fisher ........................ 292/216
6,254,148 B1 7/2001 Cetnar
6,290,269 B1 * 9/2001 Bodley-Scott et al. ...... 292/216
6,431,617 B1 * 8/2002 Fisher ........................ 292/216
6,568,721 B2 * 5/2003 Fisher ........................ 292/216
6,652,009 B2 * 11/2003 Fisher et al. ............. 292/251.5
6,717,290 B2 * 4/2004 Hirota et al. .............. 307/10.2

FOREIGN PATENT DOCUMENTS

EP 0 589 158 A1 3/1994
WO WO 90/05822 5/1990

OTHER PUBLICATIONS

Eurpoean Search Report Sep. 7, 2004.

* cited by examiner

*Primary Examiner*—Brian Sircus
*Assistant Examiner*—Marc L Shin
(74) *Attorney, Agent, or Firm*—Carlson, Gaskey & Olds

(57) ABSTRACT

A door latch arrangement (10) includes a latch bolt (12) releasably retainable in a closed position by a pawl (14). The pawl is connected to an inside release member (26) by a first transmission path (28). The first transmission path is interruptible by operation of a first actuator (32). The pawl is further connected to an outside release member (16) by a second transmission path (18), the second transmission path being interruptible by operation of a second actuator (22). The door latch arrangement further includes a detection device for detecting when the inside release member is operated. The first and second actuators are controlled by a control device (36), operable in response to signals from the detection device to provide for override unlocking.

13 Claims, 1 Drawing Sheet

DOOR LATCH ARRANGEMENT

CROSS REFERENCE TO RELATED APPLICATIONS

This application claims priority to United Kingdom (GB) Patent Application Number 0121066.5 filed on 31 Aug. 2001.

BACKGROUND OF THE INVENTION

The present invention relates to door latch arrangements, and in particular, door latch arrangements having a one pull or two pull override unlocking feature.

Door latch arrangements are known which have a motor operable to break or block an outside transmission path from an outside door handle to a pawl of the latch arrangement to lock a door latch. Such latch arrangements also have a motor operable to break or block an inside transmission path between an inside door handle and the pawl to provide for a child safety feature. Such latches further include a mechanical linkage between the inside transmission path and the outside transmission path, which operates when the inside door handle is pulled and the latch is in a locked condition to unlock and open the door latch such that when a driver or passenger exits the vehicle and slams the door he is not inadvertently locked out of his vehicle. This is known as a one pull override unlocking feature.

Other door latches are known which include three motors, the first two operating to provide a lock function and a child safety function, as described above and a third motor operable to provide a superlock function.

A problem with such known latches is that they are complicated and require many components. Furthermore, they are not interchangeable when a different operation is required.

SUMMARY OF THE INVENTION

Thus, according to the present invention, there is provided a door latch arrangement including a latch bolt releasably retainable in a closed position by a pawl. The pawl is connected to an inside release member by a first transmission path, which is breakable or blockable by operation of a first actuator. The pawl is further connected to an outside release member by a second transmission path, which is breakable or blockable by operation of a second actuator. The door latch arrangement further includes a detection device for detecting when the inside release member is operated. The first and second actuators are controlled by a control device, operable in response to signals from the detection device to provide for override unlocking.

Advantageously such a system provides for override unlocking through a simple detection device. In particular, it is not required to have a mechanical link between the inside and outside transmission paths for override unlocking.

BRIEF DESCRIPTION OF THE DRAWINGS

The invention will now be described, by way of example only, with reference to the drawings in which.

DETAILED DESCRIPTION OF THE PREFERRED EMBODIMENTS

Figure 1:
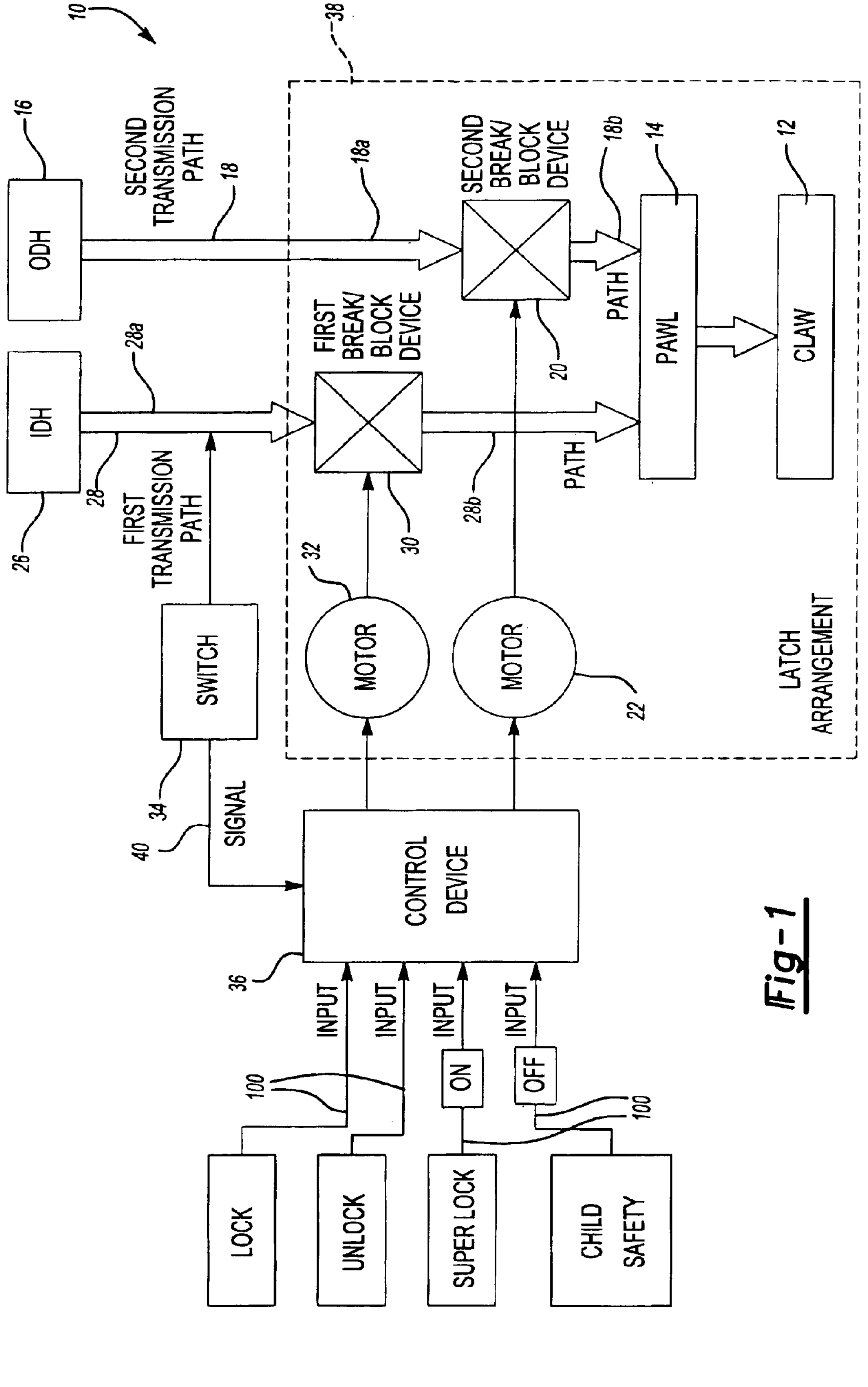
FIG. 1 shows a schematic view of a door latch arrangement according to the present invention.

For the avoidance of doubt, following terms are now defined:

A latch is in an unlocked security condition when operation of an inside door handle or an outside door handle causes opening of the latch.

A latch is in a locked security condition when operation of an outside door handle does not unlatch the latch but operation of an inside door handle does unlatch the latch.

A latch is in a superlocked security condition where operation of an outside or an inside door handle does not unlatch the latch. In particular, it should be noted that multiple operations of the inside and outside door handles, in any sequence, does not unlatch the latch.

A latch is in a child safety "on" security condition when operation of an inside door handle does not unlatch the latch but operation of an outside door handle may or may not unlatch the latch depending on whether the latch is in an unlocked or locked condition.

Override unlocking is a function whereby operation of an inside door handle, with the latch in a locked condition, causes unlocking of the latch.

Note that override unlocking is applicable to a latch in a locked child safety "off" condition, and is also applicable to a latch in a locked child safety "on" condition. In particular, starting from a locked child safety on condition of a latch having override unlocking, an actuation of the inside handle will unlock the door, but this operation or any subsequent operation of the inside door handle will not unlatch the door since the child safety feature is "on." Nevertheless, once the latch has been unlocked by actuation of the inside door handle, a subsequent operation of the outside door handle will unlatch the latch. In particular, it should be noted that this situation is different from a superlocked latch, since in the former case, a particular sequence of handle operations, i.e. operation of the inside handle followed by operation of the outside handle, will open the door. This is not the case for superlocking.

One pull override unlocking is a function whereby with the latch in a locked child safety "off" condition, a single pull of the inside door handle results in unlocking of the door and also unlatching of the door.

Two pull override unlocking is a function, whereby with the latch in a locked child safety "off" condition, a first pull of the inside door handle results in unlocking of the latch but does not result in unlatching of the latch. However, a further operation of the inside door handle will then cause the latch to unlatch.

With reference to FIG. 1, there is shown a latch arrangement 10 including a latch bolt in the form of a rotating claw 12, which can be held in a closed position by pawl 14. In further embodiments, claw 12 may have a first safety abutment for engagement by pawl 14 in order for an associated door to be held in a first safety position, where the door is not fully closed, but nevertheless is prevented from opening.

An outside door handle 16 is operably connected to the pawl 14 via a second transmission path 18. A second break/block device 20 is provided in second transmission path 18, thus dividing second transmission path 18 into path 18A, which connects outside door handle 16 to the second break/block device 20 and path 18B, which connects the second break/block 20 device to the pawl 14.

The second break/block device 20 is illustrative here of two embodiments. First, there can be provided a break in the second transmission path 18, such that operation of the outside door handle 16 is possible, thus moving path 18A but in view of the break 20 path 18B does not move.

Alternatively, there can be provided a block 20 such that the outside door handle 16 and path 8A cannot be moved. Either embodiment is applicable to the present invention.

Thus, with second break/block device 20 acting to connect path 18A with path 18B or in the further embodiment with second break/block device 20 acting so as not to block movement of path 18A, operation of the outside door handle 16 causes path 18A to move path 18B and lift the pawl 14 such that the claw 12 can release an associated striker, thus enabling the door to open. Second break/block device 20 is operable via motor 22 to move between a break/block position and a position where path 18A is connected to path 18B or where path 18A is unblocked.

The latch arrangement 10 further includes an inside door handle 26, a first transmission path 28, a first break/block device 30, which divides the first transmission path 28 into path 28A and path 28B, and motor 32. Operation of these components is similar to their corresponding components associated with the outside door handle 16. In particular, the first break/block device 30 is similarly illustrative here of two embodiments. The position of the inside door handle 26 can be determined by a detection device, in this case in the form of a switch 34.

A control device 36 is operable to control motors 22 and 32 and hence determine the security condition of the latch. Typically, the control device 36 would be a microprocessor or an integrated control unit (ICU).

In this case components 12, 14, 18B, 20, 28B, 30, 22, 32 and parts of path 18A and path 28A are provided on a latch 38 as indicated by the dotted line. When the invention is applied to a passenger or driver's door of a car (automobile), then typically the latch 38 will be provided on a rear shut face of the door. The outside door handle will be positioned mid-way up a rear outer face portion of the door, and the inside door handle will be provided mid-way up and towards the front on the inside of the door to provide for good ergonomics. The switch 34 can be provided at a suitable location either adjacent to the inside door handle 26 or part way along path 28A or even within the latch 38.

The control device 36 can also be located at any convenient location. Note, however, that the physical position of the components shown in FIG. 1 is primarily defined by packaging requirements and is not critical to the working of the invention.

The control device 36 can receive various inputs 100 that dictate the security condition of the latch as required by the user. Typically, the user will be provided with door mounted, or dash board mounted switches in order for the user to be able to indicate the required security condition. Remote control devices or passive entry devices can also be used to indicate a required security condition.

Possible security conditions are:

locked, child safety on;

locked, child safety off;

unlocked, child safety on;

unlocked, child safety off; and superlocked.

Upon receipt of an appropriate input 100, the control device 36 will ensure that motors 22 and 32 move their corresponding second break/block device 20 and first break/block device 30 to an appropriate position if necessary.

Thus, starting from a superlocked condition, an input 100 requiring a change in the security condition to locked will result in motor 32 moving the first break/block device 30 to a connected/unblocked position such that subsequent operation of the inside door handle 26 will unlatch the door. Under such circumstances, the second break/block device 20 will remain in an unchanged position ensuring that operation of the outside door handle 16 does not unlatch the latch.

In particular, it should be noted that in a superlocked condition both first break/block device 30 and second break/block device 20 are in a break/block position. An input 100 requiring a change of security condition to locked child safety "on" will not result in any change to the position of the first break/block device 30 and second break/block device 20.

Control device 36 can also receive signals from switch 34 indicating the position of the inside door handle 26. The control device 36 can be programmed to act in either a one pull override use locking mode or a two pull override locking mode.

Thus, with control device 36 programmed as a one pull override function, operation of the inside door handle 26 with the latch 38 in a locked condition will actuate switch 34 sending a signal 40 to control device 36, which, in turn, actuates motor 22 to connect/unblock second break/block device 20 to unlock the latch 38 whilst simultaneously the inside door handle 26 will move path 28A and 28B (since the latch 38 is in a locked condition and hence the first break/block device 30 connects/unblocks first transmission path 28), resulting in the door opening.

However, with control device 36 programmed as a two pull override function, operation of the inside door handle 26, with the latch 38 in a locked condition, will actuate switch 34, sending a signal 40 to control device 36, which, in turn, actuates motor 22 to connect/unblock second break/block device 20 to unlock the latch 38. However, under these circumstances, the first break/block device 30 acts to break/block the first transmission path 28, hence the door does not unlatch.

Once the inside door handle 26 has been returned to its rest position (which preferably can be determined by switch 34), only then does the control device 36 actuate motor 32 to connect/unblock first break/block device 30. Thus, a subsequent operation of the inside door handle will then cause the latch 38 to open.

Thus, by providing a simple software change to the control device 36, it is possible to provide for one pull override unlocking or two pull override unlocking with the same components.

Note that with the latch 38 in an unlocked or superlocked condition, whilst switch 34 is operated as the inside door handle 26 is operated, it is not necessary for the control device 36 to operate motors 32 or 22.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A door latch arrangement, comprising:

a latch bolt releasably retainable in a closed position by a pawl, the pawl being connectable to an inside release member by a first transmission path, the first transmission path being interruptible by operation of a first actuator;

the pawl further being connectable to an outside release member by a second transmission path, the second transmission path being interruptible by operation of a second actuator;

a detection device for detecting when the inside release member is operated; and the first actuator and the second actuators controllable by a control device, the control device operable in response to a signal from the detection device to provide for override unlocking.

2. The door latch arrangement as defined in claim 1 in which, starting from a locked condition, a first operation of the inside release member causes the door latch arrangement to change to an unlocked condition and causes the door latch arrangement to unlatch.

3. The door latch arrangement as defined in claim 2 in which starting from a locked child safety "on" condition, the first operation of the inside release member causes the door latch arrangement to change to the unlocked condition and causes the door latch arrangement to unlatch.

4. The door latch arrangement as defined in claim 1, in which starting from a locked condition, a first operation of the inside release member causes the door latch arrangement to change to an unlocked condition, but the door latch arrangement remains latched, and a further operation of the inside release member causes the door latch arrangement to unlatch.

5. The door latch arrangement as defined in claim 1 in which the control device is configured to receive an input indicating a required security condition of the door latch equipment.

6. The door latch arrangement as defined in claim 1 in which the control device further provides for super locking.

7. The door latch arrangement as defined in claim 1 in which the control device further provides for a child safety condition.

8. The door latch arrangement as defined in claim 1 in which the control device is programmable so as to provide for at least one pull override unlocking.

9. The door latch arrangement as defined in claim 1 in which the inside release member is an inside door handle.

10. The door latch arrangement as defined in claim 1 in which the outside release member is an outside door handle.

11. The door latch arrangement as defined in claim 1 wherein at least one of the first transmission path and the second transmission path comprises a first path portion and a second path portion, the at least one of the first transmission path and the second transmission path interruptible by preventing motion along at least one of the first path portion and the second path portion.

12. The door latch arrangement as defined in claim 11 wherein the at least one of the first transmission path and the second transmission path is interruptible by preventing motion along both the first path portion and the second path portion.

13. The door latch arrangement as defined in claim 11 wherein the at least one of the first transmission path and the second transmission path is interruptible by creating a break between the first path portion and the second path portion.

* * * * *